3,002,576
WEIGHING SCALE
Ernst Kuhnle, Hermann-Rommel-Strasse 28,
Balingen, Wurttemberg, Germany
Filed Apr. 16, 1958, Ser. No. 728,852
5 Claims. (Cl. 177—255)

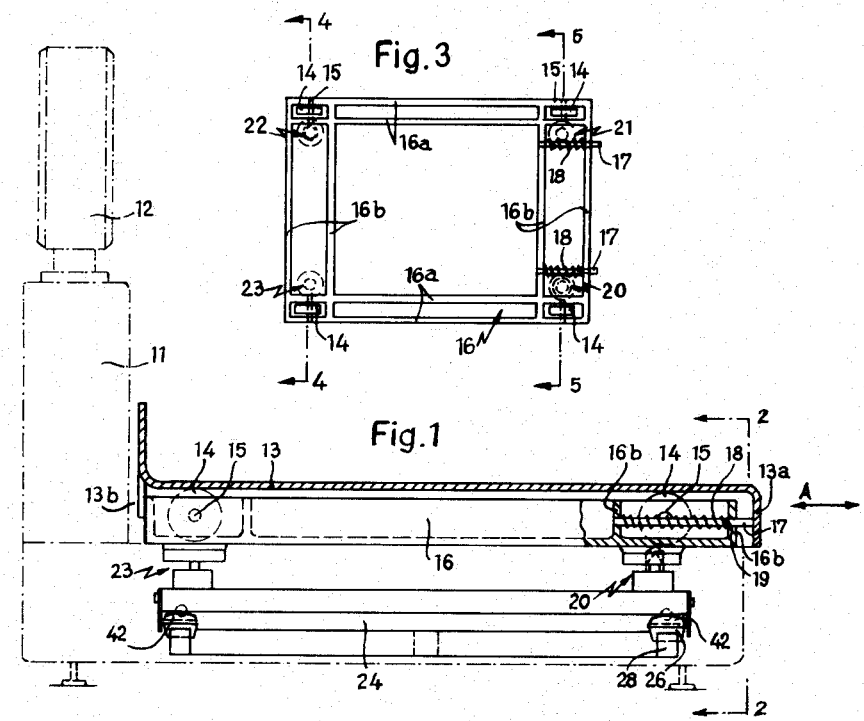

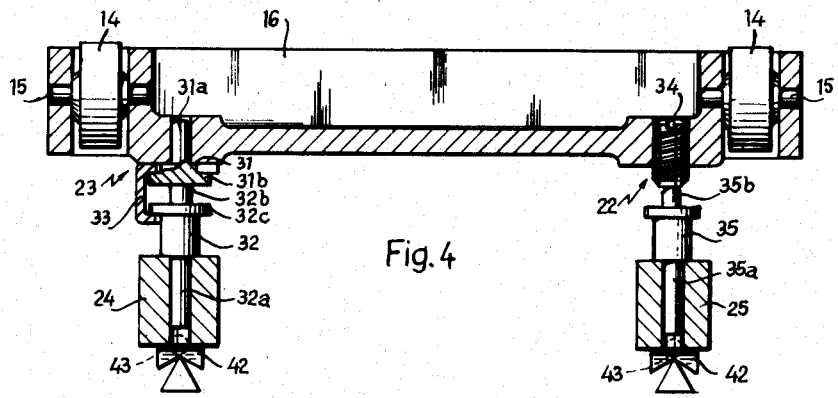
Fig. 4
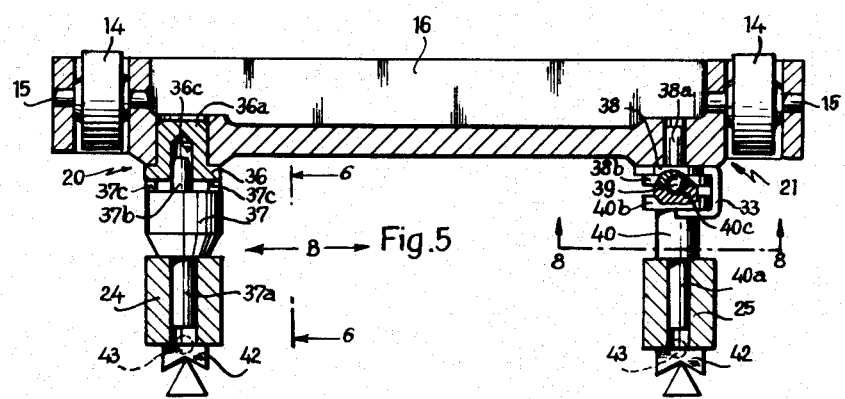
Fig. 5
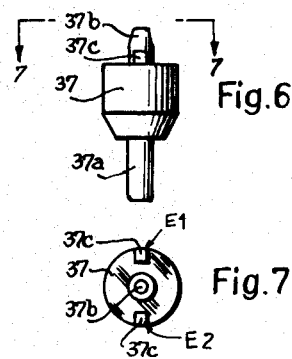
Fig. 6
Fig. 7
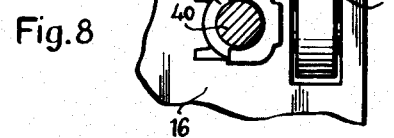
Fig. 8
INVENTOR
Ernst Kuhnle
BY Michael S. Striker
ATTORNEY

United States Patent Office 3,002,576
Patented Oct. 3, 1961

This invention relates to weighing scales of the platform type in which the platform is supported by a plurality of parallel fulcrum edges upon a system of weighing levers from which weight indications may be derived.

In the practical operation of such a weighing scale the platform is likely to be subjected to horizontal jolts from various directions. The invention therefore relates more particularly to improvements in the means for yieldably supporting the platform in a manner whereby the fulcrum mountings will be protected against undue stress or damage from such jolts.

It is among the objects to provide improved supporting means rendering the platform yieldable horizontally in response to jolts from various directions, while avoiding the inherent drawbacks of prior constructions such as the known suspensions or their equivalents which would allow the platform to yield in an uncontrolled manner upon impact, and would require a considerable amount of time for the platform to recover its position of rest, and so would affect the weight indications.

The object then is to provide improved supporting means whereby the fulcrum mountings are protected against horizontal impacts or jolts, with the platform yieldable in all directions from a position of rest in such a manner that the platform will recover its position of rest and be stabilized quickly and positively, thereby providing prompt and accurate weight indications.

In accordance with the invention, this object is attainable by providing novel supporting means whereby a horizontal carrier member is supported upon the fulcrum edges in such a way that it will yield to a limited extent only under horizontal impact in a direction transversely of the fulcrum edges, but with the tendency to return to its position of rest. Upon this carrier member is mounted the platform member proper in such a manner as to be movable relative to the carrier member only in a direction parallel to the fulcrum edges, but with the tendency to return to its position of rest on the carrier member.

According to one feature, the novel supporting means for the carrier member comprises a plurality of upright weight supporting members carried by the fulcrum means and tiltable together to a limited degree about the fulcrum edges as horizontal axes. The carrier members have operating connections with the upright supporting members allowing for lateral displacement of the carrier member in both directions from the position of rest.

Further features lie in details of construction and arrangement of the novel supporting means, as well as in stabilizing means associated with the supporting means for quickly returning the carrier member to its position of rest.

Other features and advantages will hereinafter appear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal part-sectional view of the weighing scale, illustrating the carrier member and the platform member in their operational relationship;

FIG. 2 is an end view taken on lines 2—2 of FIG. 1;

FIG. 3 is a plan-view in detail taken on line 3—3 upon the carrier member of FIG. 1, with the platform member omitted;

FIG. 4 is an enlarged cross-section view of the carrier member taken on line 4—4 of FIG. 3, and embodying structural examples of the supporting means for the carrier member;

FIG. 5 is a similar enlarged cross-sectional view taken on line 5—5 of FIG. 3, embodying other structural examples of the supporting means;

FIG. 5a is an operational detail view illustrating the function of one of the examples of the supporting means.

FIG. 6 is a detail view of the upright supporting members, taken on line 6—6 of FIG. 5, showing a pair of upward projections providing a pair of tilting edges;

FIG. 7 is a plan view of the member shown in FIG. 6; and

FIG. 8 is a detail cross-section taken on line 8—8 in FIG. 5, illustrating more clearly the arrangement of a semi-rigid connection between one of the upright supporting members and the carrier member.

The weighing scale embodying the invention in a preferred form thereof is contained substantially in a housing indicated by dot and dash lines, with a column 11 indicated at one end of the housing to carry the weight indicator head 12. Within the horizontal base portion of the housing is contained the conventional weighing lever system.

The weighing scale being of the platform type comprises a load receiving platform member 13 horizontally movable in a linear direction indicated as by arrow A upon a carrier member or frame 16 rectangular in plan view as seen in FIG. 3. A set of rollers 14 are mounted in respective corners of the carrier member 16 for the purpose of anti-frictionally supporting the platform member 13 in its prescribed linear movement upon the frame. The platform member is formed at the near end with a downward flange or skirt portion 13a engaging the outer end of a pair of spring-urged horizontal snubbing rods 17 mounted for horizontal axial movement in upright ribs 16b formed on the frame or carrier member 16, the snubbing rods thus being shiftable axially in a direction coextensive with the direction of linear movement of the platform member 13 relative to the supporting frame 16. A compression coil spring surrounds each of the snubbing rods 17, being confined between one of the ribs 16b and a cross pin 19 provided on the rod. In this way the platform member 13 is urged at all times to its forward end position in the direction away from the column 11 and the indicator head 12, that end position being defined by a stop 13b provided upon the far end of the platform member 13 for engaging the adjacent end portion of the carrier member 16. An impact or jolt received in the horizontal direction of arrow A and coextensive with the fulcrum edges, may displace the platform member 13 along its prescribed line of movement upon the carrier member to an extent limited by its abutment against the indicator column 11. Such horizontal linear displacement against the pressure of springs 18 avoids having the impact transmitted to the fulcrum mountings 42 referred to further below.

It will be seen in FIG. 3 that the carrier member 16 is supported at four points or localities 20, 21, 22, 23. It will further be seen that at points 20 and 23 the carrier member is supported upon respective fulcrum means by way of a transverse beam 24, while at points 21 and 22 that member is supported by a horizontal beam 25, both horizontal beams extending in horizontally spaced parallel relationship with respect to each other and coextensive with the direction of the linear movement of the platform member on the carriers. These beams 24 and 25 are supported upon fulcrum edge members 26 and 27 (see FIG. 2) carried by the weighing levers 28 and 29 respectively so that the weight indication may be derived by way of fulcrum edge members 28a and 29a for transmittal to the weight indicating instrumentalities.

By way of example, a different structural embodiment to illustrate the compensatory supporting means are shown in the locality of supporting point 20 and in the locality of the supporting point 23 respectively. In the case of the supporting points 20 and 21 there are provided in effect articulated or pivotal connections whereby the parts are movable about horizontal axis parallel to fulcrum edges, whereas at the supporting points 22 and 23 the supporting means include cooperative abutment members allowing for compensatory mobility between the upright supporting member and the carrier member. The two supporting points 20 and 23 provided by the horizontal beam member 24 in this example illustrate each a different embodiment of the abutment type of support between complementary abutment members whereas supporting points 21 and 22 provided by the other beam member 25 are of the type that has articulated or pivotal connections owing to the provision of spherical or curved bearing contact faces, one embodiment of that type of bearing being shown in FIG. 4 while another one is shown in FIG. 5.

In detail, the supporting point 23 comprises a horizontal downward facing abutment plate 31 having an upward reduced pin portion 31a seated in the carrier member 16. Cooperative with this down-facing abutment plate 31 is an abutment pin or part 32 herein also termed an upright compensating supporting member or post.

In this example the pin is mounted on the beam member 24 by means of a reduced pin portion 32b fitted into a vertical bore provided in the beam member. This supporting member 32 is formed with a shoulder portion 32c whereas the upper associated abutment member 31 is formed with a corresponding shoulder portion 31b. These two complementary shoulder portions 31b and 32c are engaged by a U-shaped coupling member 33 in a manner whereby the complementary abutment members 31 and 32 are connected loosely with each other, in what is herein called a semi-rigid relationship. The semi-rigid character of this connection is due to the fact that one shank of the U-shaped coupling member 33 engages the abutment member 32 in tight relationship therewith, whereas the other shank of the coupling member engages the upright member 32 with sufficient clearance to allow for the limited motion of the parts relative to each other.

In the example of the supporting point 22 (see FIG. 4) the supporting means comprises a screw member 34 threaded into the carrier member 16, the screw member presenting at its lower end a transverse abutment face to be engaged upon by the complementary upright supporting member here shown to be in the form of a pin member 35 being formed at the lower end with a reduced pin portion 35a fitted into a vertical bore provided in the beam member 25, so that in this way the member 35 is firmly seated in the beam. At its upper end this pin member 35 is formed with a reduced pin portion 35b presenting an upper terminal cylindrical surface curved about a horizontal axis. The generatrix of this cylindrical surface at the peak thereof is parallel to and substantially in a vertical plane with the horizontal vortex line of the fulcrum bearing member 42 mentioned below.

In the example of the supporting point 20 an inverted socket member 36 is fitted into a vertical bore provided in the carrier member 16, the socket member having a downwardly open dead end bore 36c in which lodges the reduced and specially shaped or tapered top end portion 37b of the complementary pin member 37 constituting the upright compensating supporting member for the carrier member 16 at this point. In this example the pin member 37 has an intermediate portion of large diameter, a reduced lower end portion or pin portion 37a fitted into a vertical bore provided in the horizontal beam member 24, and a reduced top end portion or pin end 37b tapered towards the end so as to have relatively loose fit and angular mobility in the dead end bore 36c of the receiving socket 36. The intermediate large diameter middle portion of pin member 37 has an annular horizontal shoulder face surrounding the reduced top end portion 37b, and from this shoulder rise a pair of projections 37c arranged in diametrically opposed position relative to each other presenting horizontally aligned abutment faces normally engaged by corresponding abutment faces presented at the underside of the socket member 36a.

In the example of supporting point 21 the compensatory supporting means comprise an inverted bearing member 38 having a reduced pin portion 38a which constitutes its upper end fitted into a vertical bore provided in carrier member 16, whereby the bearing member is firmly seated in the carrier member in inverted relationship thereto. This inverted bearing member is formed at its lower end with a shoulder portion 38b, the lower face of this bearing member being gauged out or formed with a spherical recess into which fits a spherical bearing member 39. A complementary bearing member to receive the bearing sphere 39 is provided by a pin member 40 having a reduced pin portion 48 forming its cover end fitted into a vertical bore provided in the beam member 25, whereby the pin member 40 is firmly seated in the beam 25 so as to tilt unitary therewith upon the associated fulcrum means. The complementary lower spherical bearing face in the pin member 40 is designated by the numeral 40c. The top face of the pin member 40 is defined by a cylindrical curve the generatrix of which at the theoretical peak of the surface extends parallel to the vortex line of fulcrum bearing member 42 vertically below. The inverted bearing member 38 and the upright supporting member 40 are shown in this example to be coupled together in a semi-rigid manner to allow for limited tilting movement about the fulcrum edge, by means of a U-shaped coupling member 41 engaging the shoulder portions 38b and 40b formed upon the complementary members 38 and 40 respectively. Thus there is provided a coupling connection of limited mobility, similar to that shown in connection with the supporting point 23 of FIG. 4.

The beam members 24 and 25 provide the support for the four supporting points 20, 21, 22, 23, the beam members themselves being in turn supported by the fulcrum bearing members 42 aforementioned and shown to be secured against horizontally directed displacement as by means of the balls 43 effective to lock the fulcrum bearing members in their respective seats.

Whenever there is imparted to the platform member 13 a jolt or impact as in the direction of arrow B in FIG. 5, such impact will be transmitted to the carrier member 16, the direction of such impact then being transversely of the fulcrum edges which support the carrier member. However, only when the impact attains a certain intensity will the carrier member 16 yield in that direction. Hence, as illustrated in FIG. 5a, the upright supporting members will be tilted slightly while either one or the other of the edges E1 and E2 of the projections 37c will become effective as tilting edges in contact with the bottom face of the inverted socket member 36a. Such tilting movement of the upright pin member 37 about the fulcrum edge in the fulcrum bearing 42 occurs similarly in the example at point 23, where the opposed peripheral edge portions of the inverted abutment pin portion 32b will act as tilting edges incident to tilting of the upright member 32 about the associated fulcrum edge in the fulcrum bearing member 42. Here again, the mobility is limited by the coupling member 33 engaging the complementary abutment portions in a manner similar to that described above in connection with supporting point 21.

In response to the impact directed transversely of the fulcrum edges both the beam members 25 and 24 must move or tilt in unison together with the upright supporting members or pin members mounted on them. It will be noted, however, that a rolling contact is realized between the contact faces of pin members 38 and 40, at point 21, as well as between the contact faces of members 34 and 35 at point 22.

A similar frictionless rolling contact between these parts will occur when they move due to the weighing operation itself, this rolling movement thus being due to the fact that the loaded carrier member 16 because of its semi-rigid connection with the beam member 24 must follow the arcuate movement of fulcrum mounting 42 and 26 about the fulcrum edge of fulcrum member 28a on lever 28. Similarly, the opposite fulcrum mounting 42 and 27 supporting the beam member 25 must follow the opposite arcuate movement incident to the angular movement of the weighing lever 29 about the fulcrum edge 29a. In this way, due to the provision of the compensatory supporting means or tiltable upright supporting members, the variations occurring in the distance D between the fulcrum mounting 42, 26 and the fulcrum mounting 42, 27 are compensated and absorbed.

It will be understood that each of the elements described above, or two or more together, may also find a useful application in other types of weighing scales differing from the types described above.

While the invention has been illustrated and described as embodied in platform type weighing scales, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a weighing scale of the platform type, the combination which comprises a horizontal carrier member; fulcrum means having parallel fulcrum edges; supporting means supporting said carrier member and supported by said fulcrum means in such a manner as to be effective to transmit the weight of the carrier member to said fulcrum means and to render said carrier member horizontally yieldable only in a direction transversely of the fulcrum edges from a position of rest relative to the fulcrum edges; said supporting means comprising two pairs of upright supporting members tiltable together about respective fulcrum edges with the tendency to return to the position of rest, said upright supporting members having operative connections with the carrier members whereby said supporting members may tilt incident to lateral displacement of the carrier member from the position of rest, wherein two of said operating connections comprise means providing for pivotal movement of the carrier member on the supporting member about a horizontal axis parallel to the fulcrum edges, and wherein the other two operating connections comprise abutment means having load transmitting horizontal abutment contact faces one of said faces being formed with a pair of horizontal tilting edges parallel to each other and to the fulcrum edges and spaced to straddle the center of the supporting member, one or the other of said parallel tilting edges being rendered effective as such incident to horizontal displacement of the carrier member in the one or in the other direction from its position of rest.

2. In a weighing scale of the platform type, the combination which comprises a horizontal carrier member; fulcrum means having parallel fulcrum edges; supporting means supporting said carrier member and supported by said fulcrum means in such a manner as to be effective to transmit the weight of the carrier member to said fulcrum means and to render said carrier member horizontally yieldable only in a direction transversely of the fulcrum edges from a position of rest relative to the fulcrum edges; a platform member mounted upon said carried member in a position of rest and yieldably movable in a horizontal plane relative to said carrier member only in a direction normal to the direction of movement of said carrier member and tending to return from any such moved position to said position of rest; said supporting means comprising two pairs of upright supporting members tiltable together about respective fulcrum edges with the tendency to return to the position of rest, said upright supporting members having operative connections with the carrier members whereby said supporting members may tilt incident to lateral displacement of the carirer member from the position of rest, wherein two of said operating connections comprise means providing for pivotal movement of the carrier member on the supporting member about a horizontal axis parallel to the fulcrum edges, and wherein the other two operating connections comprise abutment means having load transmitting horizontal abutment contact faces, one of said faces being formed with a pair of horizontal tilting edges parallel to each other and to the fulcrum edges and spaced to straddle the center of the supporting member, one or the other of said parallel tilting edges being rendered effective as such incident to horizontal displacement of the carrier member in the one or in the other direction from its position of rest.

3. In a weighing scale of the platform type, the combination which comprises a horizontal carrier member; fulcrum means having parallel fulcrum edges; supporting means supporting said carrier member and supported by said fulcrum means in such a manner as to be effective to transmit the weight of the carrier member to said fulcrum means and to render said carrier member horizontally yieldable only in a direction transversely of the fulcrum edges from a position of rest relative to the fulcrum edges; a platform member mounted upon said carrier member for movement from a position of rest relative to the carrier member only in a direction parallel to said fulcrum edges; stabilizing means operatively connected to said platform member for effecting the return of said platform member to said position of rest; said supporting means comprising two pairs of upright supporting members tiltable together about respective fulcrum edges with the tendency to return to the position of rest, said upright supporting members having operative connections with the carrier members whereby said supporting members may tilt incident to lateral displacement of the carrier member from the position of rest, wherein two of said operating connections comprise means providing for pivotal movement of the carrier member on the supporting member about a horizontal axis parallel to the fulcrum edges, and wherein other two operating connections comprise abutment means having load transmitting horizontal abutment contact faces, one of said faces being formed with a pair of horizontal tilting edges parallel to each other and to the fulcrum edges and spaced to straddle the center of the supporting member, one or the other of said parallel tilting edges being rendered effective as such incident to horizontal displacement of the carrier member in the one or in the other direction from its position of rest.

4. In a weighing scale of the platform type, the combination which comprises a horizontal carrier member; fulcrum means having parallel fulcrum edges; supporting means supporting said carrier member and supported by said fulcrum means in such a manner as to be effective to transmit the weight of the carrier member to said fulcrum means and to render said carrier member horizontally yieldable only in a direction transversely of the fulcrum edges from a position of rest relative to the fulcrum edges; a platform member mounted upon said carrier member for movement from a position of rest relative to the carrier member only in a direction parallel to said fulcrum edges; a set of rollers mounted on said carrier member for supporting said platform member for movement upon said carrier member; stabilizing means operatively connected to said platform member for effecting the return of said platform member to said position of rest; said supporting means comprising two pairs of upright supporting members tiltable together about respective fulcrum edges with the tendency to return to the position of rest, said upright supporting members having operative connections with the carrier members whereby said supporting members may tilt incident to lateral displacement of the carrier member from the position of rest, wherein two of said operating connections comprise means providing for pivotal movement of the carrier member on the supporting member about a horizontal axis parallel to the fulcrum edges, and wherein other two operating connections comprise abutment contact faces, one of said faces being formed with a pair of horizontal tilting edges parallel to each other and to the fulcrum edges and spaced to straddle the center of the supporting member, one or the other of said parallel tilting edges being rendered effective as such incident to horizontal displacement of the carrier member in the one or in the other direction from its position of rest.

5. In a weighing scale of the platform type according to claim 3 wherein the stabilizing means include compression spring means located between said carrier member and said platform member.

References Cited in the file of this patent

UNITED STATES PATENTS

| | | |
|---|---|---|
| 916,818 | Winslow | Mar. 30, 1909 |
| 2,196,334 | Chamberlain | Apr. 9, 1940 |
| 2,657,921 | MacBride | Nov. 3, 1953 |
| 2,742,278 | Carleton | Apr. 17, 1956 |